United States Patent Office

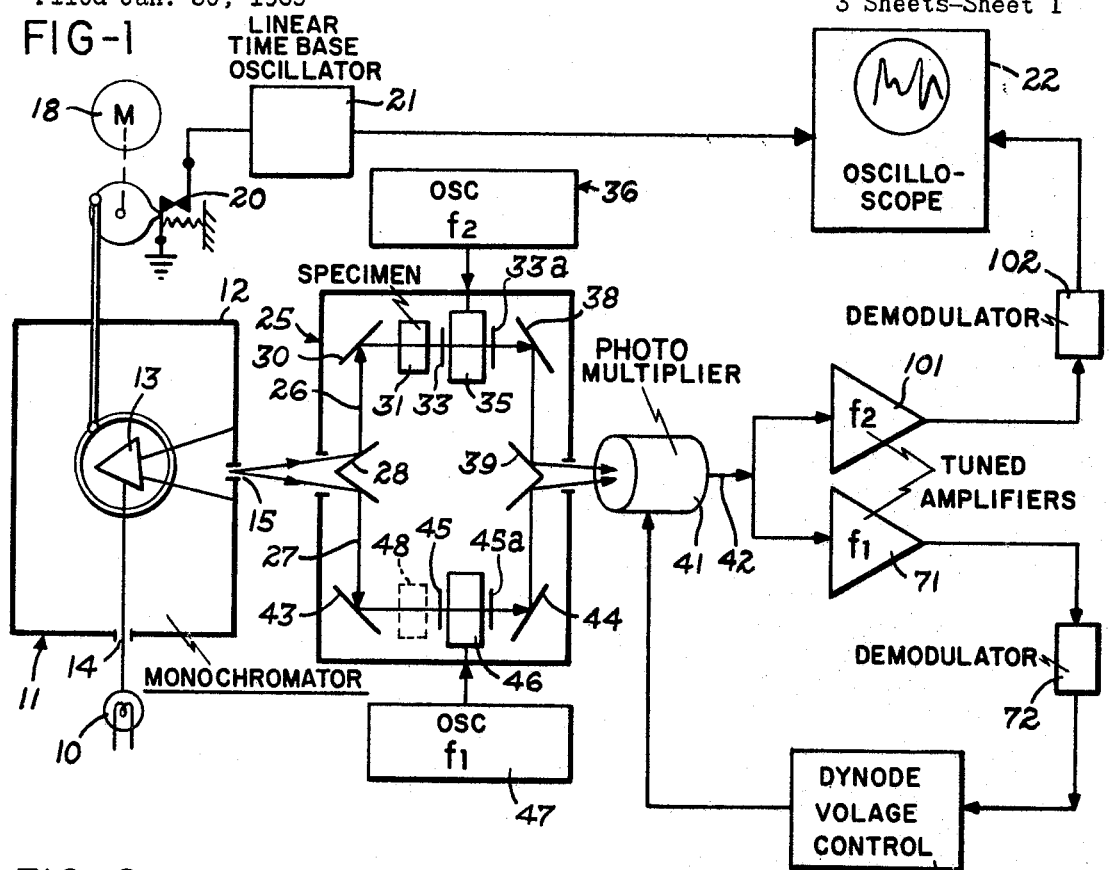

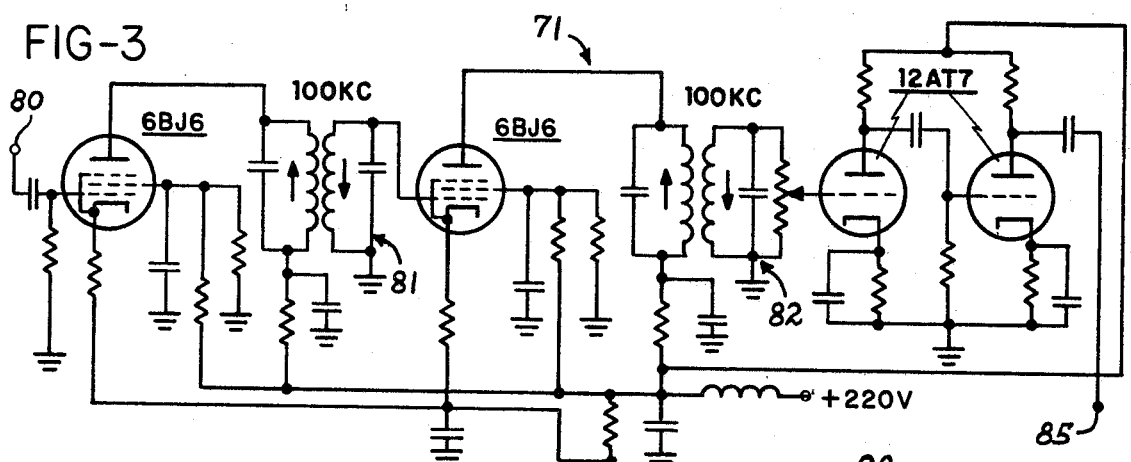
FIG-3
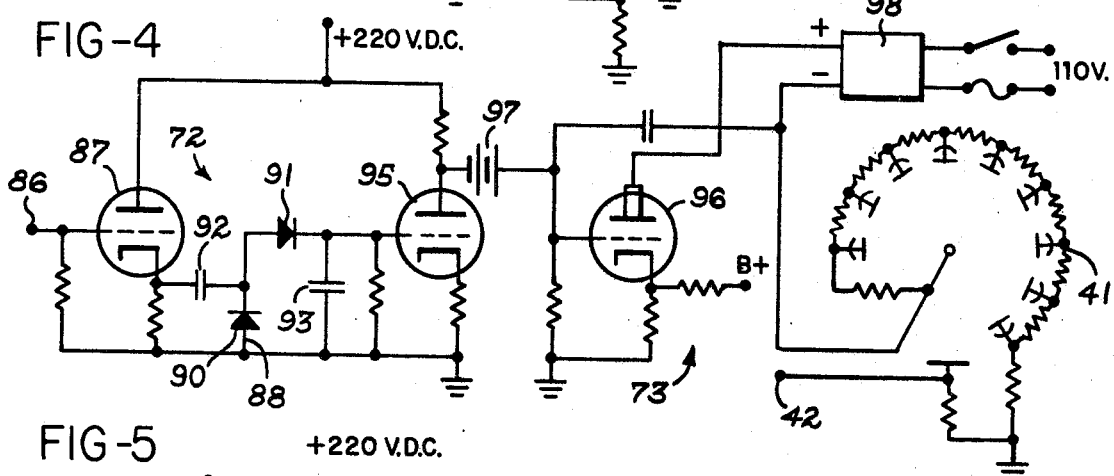
FIG-4
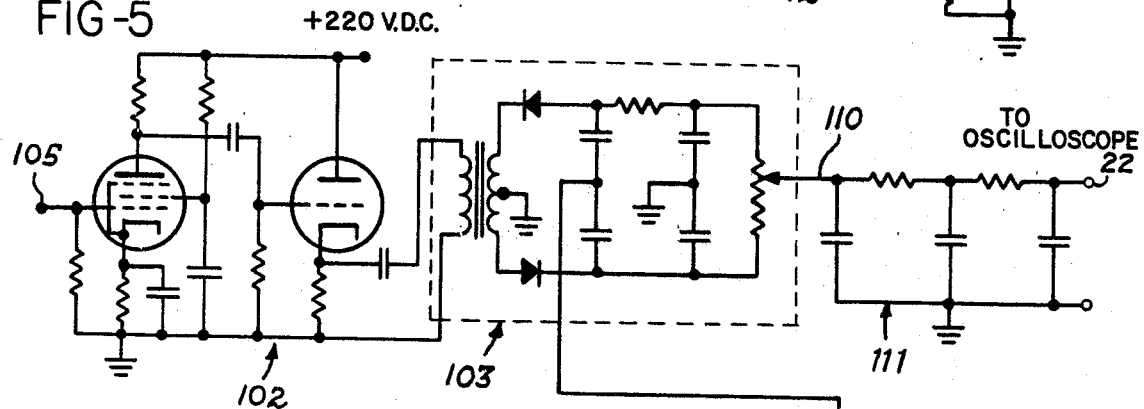
FIG-5
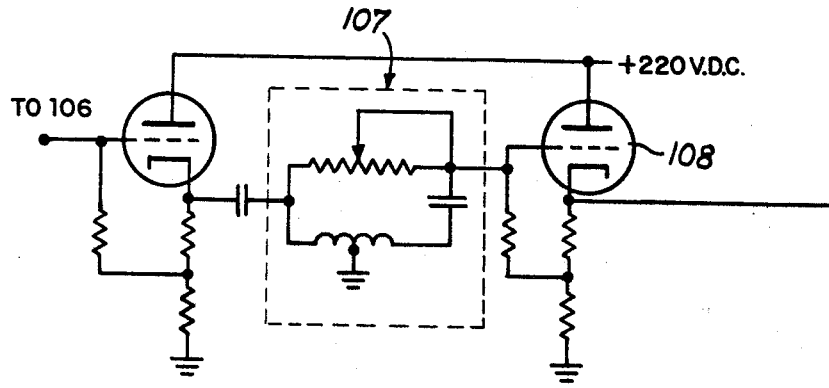

3,521,958
Patented July 28, 1970

1

3,521,958
RAPID SCANNING SPECTROPHOTOMETER
Richard W. Treharne, Xenia, Ohio, assignor to Kettering Scientific Research, Inc., Yellow Springs, Ohio, a corporation of Delaware
Continuation-in-part of application Ser. No. 522,673, Jan. 24, 1966. This application Jan. 30, 1969, Ser. No. 801,227
Int. Cl. G01j 3/42
U.S. Cl. 356—84
19 Claims

ABSTRACT OF THE DISCLOSURE

A rapid scan spectrophotometer includes a monochromator, beam splitting means to divide the output of the monochromator into a reference beam and a specimen beam, a light modulator for modulating the reference beam, a second light modulator for modulating the specimen beam to impart thereto a characteristic by which it may be distinguished from said reference beam, said characteristic either being a difference in phase or a difference in frequency, and a single photoelectric transducer positioned to receive both the sample and the reference beams and to provide electrical output signals representing the intensity of both beams. A control circuit, sensitive only to the output signal from the photoelectric transducer which represents the intensity of the reference beam, adjusts the output of the photoelectric transducer in such a way that that portion of its output representing the reference beam is held at a constant level therefore rendering the transducer output independent of variations in the intensity or wavelength of the monochromator output or its own wavelength response characteristics. Another circuit is connected to the output of the photoelectric transducer to detect the signal representing the specimen beam, and the output of this circuit is connected to a device where the absorption characteristics of the specimen may be displayed as a function of wavelength.

RELATED APPLICATION

This application is a continuation-in-part of United States application Ser. No. 522,673, filed Jan. 24, 1966, entitled, Rapid Scanning Spectrophotometer, assigned to the same assignee as the present application, now abandoned.

BACKGROUND

This invention relates to a spectrophotometer of the type which can pass a beam of monochromatic light having a variable wavelength through a specimen to be analyzed and which has a rapid response to the absorption characteristics of the sample. This invention also relates to the spectrophotometer of the type which compares the light passing through the specimen to a reference in order to assure that the instrument remains insensitive to all variable except the absorption characteristics of the specimen.

Spectrophotometers of the prior art have used mechanical means to switch the source beam of light between a path which causes it to pass through the specimen undergoing test and to a reference path which does not contain the specimen. Both paths of light are then recombined and a photoelectric transducer converts the amount of light received into an elcetrical signal. Control circuitry is provided to compensate the output of the photoelectric transducer for changes in the intensity of the source lamp or with the varying response to different colors which is inherent in each photoelectric transducer. Since these devices mechanically switch the beam of light from the specimen to a reference path, changes in the absorption characteristics of the specimen having an extremely short duration may not be observed by the photoelectric transducer and recorded.

For example, one such device utilizes a mirror vibrating at the power line frequency to switch the beam between the specimen and reference paths. With this type of device, an event in the specimen of longer than a second or more generally would be required in order for the instrument to detect a change in the intensity of the beam. Other devices have been constructed using a substantially faster switching rate between the sample path and the reference path, however, these fast switching spectrophotometers are extremely expensive while still being limited in the response time due to the mechanical limitations inherently imposed upon this type of system.

In addition, it is often desired to determine the absorption characteristics of the specimen as a function of wavelength. For this purpose, a mechanical scanning mechanism has been employed to cause cyclically varying wavelengths of light to be passed through the specimen. The rate at which the wavelengths of the light can be varied is in large part determined by the rate at which the beam is switched between the specimen and the reference paths since, at a low rate of switching, a considerable band of wavelengths would not be available to be passed through the specimen during the time the beam is shifted to the reference path.

BRIEF SUMMARY OF THE INVENTION

The spectrophotometer constructed according to this invention divides the monochromator output into two continuous beams and provides for modulating both beams at extremely high frequencies. The modulating frequency can be in the order of 100 kilocycles, or higher, and therefore allows the observation of chemical changes having extremely short duration. The spectrophotometer herein described is also capable of passing a beam of light through the sample having a narrow bandwidth and continuously variable at a higher rate of change in wavelength over a selected predetermined range of wavelengths than is possible in the prior art devices. The results of the sample analysis may be displayed visually on the face of a cathode ray tube oscilloscope and permanently recorded by photographing the display presented thereon or presented on a similar display device such as a recorder.

By providing a high modulating frequency of both the specimen beam and the reference beam, more accurate measurements of the absorption characteristics of a sample may be made, while at the same time providing for increased sensitivity of the spectrophotometer to extremely rapid changes, or transient chemical reactions, which may occur in the sample. Automatic compensation for variations in source light intensity and the response characteristics of the photoelectric transducer is also provided. A means may also be provided to compensate for any absorption of light caused by the specimen container.

Accordingly, it is an object of this invention to provide a spectrophotometer which electronically compares the source light to a reference at a rate considerably higher than presently possible with mechanical light switching type spectrophotometers and which therefore provides an instrument sensitive to high speed chemical reactions in the specimen.

Another object of this invention is to provide a spectrophotometer of the type described which may scan all or a preselected portion of the spectrum at a rapid rate with the output of the spectrophotometer automatically compensated for variations in source light intensity and response characteristics of the output photoelectric transducer.

It is another object of this invention to provide a spectrophotometer having high accuracy due to the high rate of comparison of the source through a reference path.

It is another object of this invention to provide a spectrophotometer of the type described having a narrow bandwidth beam of light which can be cyclically varied over a predetermined range of wavelengths and which continuously divides the source beam of light between a specimen path and a reference path to insure accurate absorption information of the specimen tested regardless of any instrument irregularities and variations.

Other objects and advantages of the invention will be apparent from the following description, the accompanying drawings and the appended claims.

BRIEF DESCRIPTION OF THE DRAWINGS

FIG. 1 is a block diagram of one form of a rapid scan spectrophotometer constructed according to this invention;

FIG. 2 is a schematic electrical diagram showing a bias supply and an oscillator for the electrooptic light modulators used in this spectrophotometer;

FIG. 3 is a schematic electrical diagram showing one of the tuned amplifiers used to amplify the signal from the photoelectric transducer;

FIG. 4 is a schematic electrical diagram showing a demodulator and control circuit for adjusting the voltage on the dynodes of the photoelectric transducer;

FIG. 5 is a schematic electrical diagram showing the phase discriminator circuit used to convert the electrical output of the photoelectric transducer into useful specimen absorption information for presentation on an oscilloscope.

DESCRIPTION OF THE PREFERRED EMBODIMENTS

Figure 6:
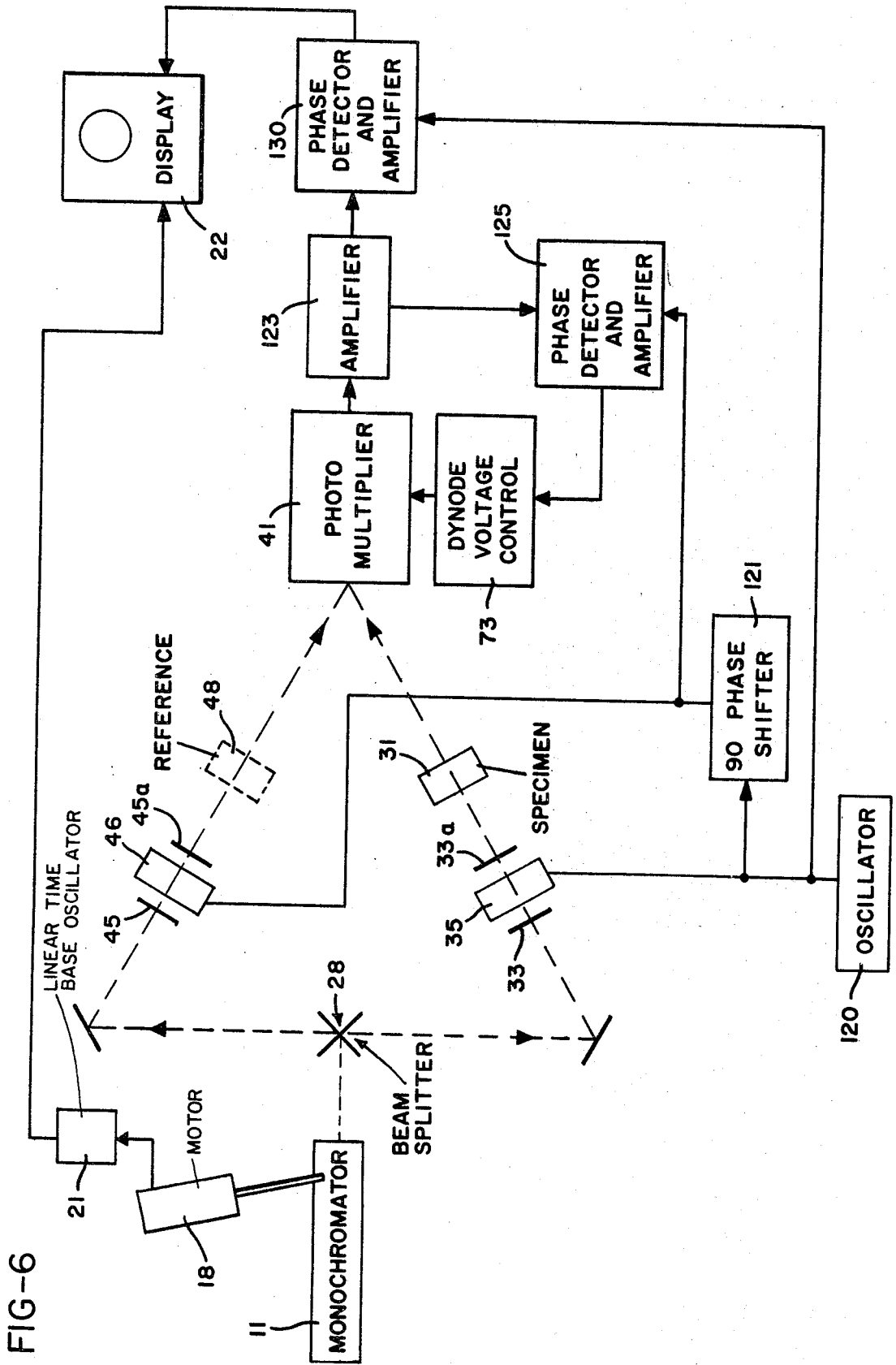
FIG. 6 is a block diagram of another embodiment of a rapid scan spectrophotometer wherein both the specimen beam and the reference beam are modulated at the same frequency, but wherein the modulating signals differ in phase.

Referring now to the drawings, which show the preferred embodiments of this invention, and particularly to the embodiment shown in FIG. 1, a source of light from lamp 10 is directed into a monochromator 11. The lamp 10 may be a commercially obtainable tungsten iodide type lamp contained within a quartz envelope to insure that a broad and full spectrum of light may be transmitted into the monochromator. The monochromator consists of a housing or box 12 having rotatably mounted therein a prism 13. A grating or other light dispersing means also may be used. The light from the lamp 10 passes through a small slit 14 in the box where the light is separated or spread into its component colors by the prism. By rotating the prism 13, a selected color is caused to pass through the slit 15 at the side of the box. Suitable focusing means, not shown in this schematic drawing, is used to obtain a sharp image of monochromatic light at the exit slit. The width of both slits 14 and 15 will determine the bandwidth of the light emitted from the monochromator, as well as the intensity of the light. For this application, it is desired that a narrow bandwidth, that is, a substantially single wavelength beam of light be applied to the specimen so that accurate measurements of the absorption characteristics of the specimen may be made. In one embodiment of this invention, both slits 14 and 15 are in the order of $\frac{1}{10}$ mm. wide thus providing a bandwidth in the order of 50 A. at the output of the monochromator. In other applications, it may be desired to decrease the bandwidth of the monochromator output to 10 A. or less. This modification of the bandwidth may be accomplished by decreasing the width of slits 14 and 15.

The angular position of the prism 13 will determine the color or frequency of the light transmitted through the slit 15. In the preferred embodiment of this invention, the prism 13 is cyclically rotated by a drive motor 18. This motor 18 also actuates a set of breaker points 20 when the prism is in a limit position. These breaker points are used to trigger a linear time base oscillator 21 and provide a linear horizontal sweep on the output oscilloscope 22 which can then be calibrated in terms of wavelength output of the monochromator. It is understood that other means for providing a representation of the wavelength output of the monochromator may be employed without departing from the spirit of this invention. Thus, a potentiometer or other position indicating transducer could also be attached to the support for the prism 13 and electrically connected to the horizontal input oscilloscope 22 to provide the horizontal deflection signal, the magnitude of which represents the wavelength or color of the light emitted from the monochromator.

The scanning rate of the monochromator or the rate at which the light spectrum is varied over a predetermined range of wavelengths may be increased by the present invention over the rates formerly possible with prior art spectrophotometers, since the modulation frequency of the light in the monitoring path and the reference path is at a substantially higher rate than heretofore possible. As a result, the entire spectrum may be scanned with the present device in the order of a few milliseconds.

The beam of light emitted from slit 15 in the monochromator is directed into a modulator assembly 25 and split into a continuous specimen or monitoring beam 26 and a continuous reference beam 27 by beam splitting means 28, such as a coated prism. Other beam splitting means may be used such as a half silvered mirror which permits a portion of the light to pass through and be directed through the specimen while reflecting the remainder into the reference path. The specimen beam 26 is directed against a mirror 30 and then passes through the specimen containing means 31 where a portion of the beam may be absorbed, depending upon the characteristics of the specimen material and the wavelength of the beam. The specimen beam 26 is then directed through a polarizing filter 33 which permits only the light oscillating in one plane to pass therethrough. A similar type of polarizing filter 33a, with its axis of transmission normally at right angle to that of filter 33, is placed after an electrooptic light modulator 35.

The electrooptic light modulator 35 causes the beam 26 to vary in intensity at a rate determined by the frequency of the signal applied to the modulator from the oscillator 36. The specimen beam is then reflected against a mirror 38 and a silvered prism 39 into a photoelectric transducer or photomultiplier tube 41 having an electrical output 42.

The reference beam 27 traverses a path predetermined by mirrors 43 and 44 and which contain crossed polarizing filters 45 and 45a and an electrooptic light modulator 46. The reference beam 27 is modulated by oscillator 47 at a frequency different from specimen beam modulating frequency. The beam is then directed into the photomultiplier tube 41 by the remaining portion of silvered prism 39. The reference beam path may also be provided with means 48 to mount a specimen holder having the same absorption characteristics as the specimen holder 31 in the monitoring beam path 26.

With the spectrophotometer constructed according to this invention, it is not necessary that the intensity of the specimen beam 26 and the reference beam 27 be identical or have any predetermined ratio. It is only desired that the ratio of beam intensities remain constant through the measuring process after the source beam is split into beams 26 and 27 by the coated prism 28.

Both the electrooptic light modulators 35 and 46 may be formed from crystals of ammonium or potassium dihydrogen phosphate having a plane of light polarization which may be rotated by varying the amount of voltage applied across the crystal. This polarization effect is known as the Pockels effect and may be considered the solid state analogue of the Kerr effect. The intensity of the voltage applied across the crystal will determine the amount or degree of rotation of the plane of light polarization. Therefore, with polarizing filters, such as filters 33, 33a and 45, 45a, placed in the beam path prior to and after the beam has passed through the electrooptic light modulator, the beam intensity may be made to vary in accordance with the intensity of the applied voltage. These electrooptic light modulators are capable of modulating the light beam with a frequency in the order of several hundreds of kilocycles and in the preferred embodiment of this invention, the specimen beam is modulated at 160 kilocycles while the reference beam is modulated at 100 kilocycles.

The modulator bias voltage supply and oscillator circuit for the electrooptic light modulators are shown in FIG. 2. The bias voltage supply circuit, shown generally at 50, is a conventional high frequency direct current to alternating current converter using a fly-back transformer 51 and high voltage rectifier 52. A filter circuit 53 assures that the direct current voltage output will be smooth and free of ripples. One terminal of the electrooptic light modulator 35 is connected to the output of the high voltage direct current supply while the other terminal is connected to ground through a secondary winding 55 of a high frequency transformer 56 in the circuit of oscillator 36. The primary 57 of this transformer is in the plate circuit of oscillator tube 60. A tickler winding 62 of transformer 56 supplies the necessary feed back voltage to the grid of oscillator tube 60 to maintain oscillation.

The frequency of the oscillator is determined mainly by the inductance of primary winding 57 and the value of capacitor 63. In a typical embodiment, the oscillator for the electrooptical light modulator 35 in the specimen or monitoring light path is tuned to 160 kilocycles while the oscillator driving the electrooptical light modulator 46 in the reference path is tuned to 100 kilocycles. The output across the secondary winding 55 of both of these oscillators in the preferred form of the invention is typically in the order of 4000 volts, peak-to-peak. Thus, with a 2500-volt potential applied to one side of the electro-optical light modulators, the oscillator will cause a variation in electrical potential of between 500 volts and 4500 volts to be applied across the modulator crystal.

The light beam 26 passing through the specimen will therefore be modulated at a rate of 160 kilocycles per second and will have an amplitude which will depend upon the absorption characteristics of the specimen itself. On the other hand, the reference beam 27 will be modulated at 100 kilocycles per second and will be applied to the same photomultiplier tube as the light which passes through the specimen. By using the 100-kilocycle modulated electrical signal from the photomultiplier tube 41, as a control, it is possible to eliminate variation in the output of the photomultiplier tube 41 due to changes in light intensity of the source lamp 10 or in the response characteristics of the photomultiplier tube 41 itself to the different colors of light which are obtained from the monochromator 11.

In order to distinguish the signal resulting from the light passing through the sample from the signal resulting from the light which traverses the reference path, the output of the photomultiplier tube 41 is passed through two separate tuned amplifiers, such as shown in FIG. 3, and demodulated, or converted to a direct current signal representative of the intensity of the light applied to the cathode of the photomultiplier tube. One of these amplifiers detects the specimen absorption information, while the other amplifier is used to correct for errors resulting from the variations in response to the photomultiplier tube to various colors.

A circuit is provided in the present invention to sense the value of the electrical output of the photomultiplier tube 41 corresponding to the value of the light contained in the reference beam and which varies the voltage on the dynodes of the photomultiplier tube 41 in such a way that the output modulated at 100 kilocycles (or the reference frequency) will remain constant regardless of variations in source intensity or to variations which are caused by the response characteristics of the photomultiplier tube 41. This control circuit includes a tuned amplifier 71 comprising a band pass filter having its center frequency centered at 100 kilocycles and having a bandwidth of approximately 10 kilocycles, and a demodulator 72 providing a direct current output proportional to the value of the 100 kilocycles modulated reference beam which is applied to the dynode voltage control circuit 73.

The amplifier, shown in detail in FIG. 3, is a conventional transformer-coupled alternating current amplifier having an input terminal 80 connected to the output 42 of the photomultiplier. The operation of this type of amplifier is well known to those skilled in the art and therefore will not be discussed in detail in this application. It is pointed out, however, that transformers 81 and 82 are slug tuned transformers which are tuned to the frequency of the input signal impressed on input terminal 80. The settings of these transformers determine the center frequency of the amplifier and the width of its band pass. The output of the amplifier at terminal 85 is therefore an alternating current signal having a strength proportional to a magnitude of the signal impressed on terminal 80, and represents the value of the light intensity falling on the photomultiplier tube 41 due to the reference beam 27.

The demodulator 72 (FIG. 4) comprises an input terminal 86 connected directly to terminal 85 of the amplifier 71 and which provides one additional stage of amplification and isolation through the cathode follower 87. The output of the cathode follower is applied to a rectifier network 88 consisting of a pair of diodes 90 and 91 and a pair of capacitors 92 and 93. The direct current output of this rectifier network is applied to the grid of tube 95, the output of which is directly coupled to the grid of the series regulator tube 96 through a battery 97 to control the current through that tube and therefore the voltage on the dynodes 10 of photomultiplier tube 41. Since the photomultiplier tube 41 has an output response which is proportional to the voltage applied to the dynodes, controlling the voltage on this tube by the series regulator tube 96 permits the electrical reference signal output of the photomultiplier to remain constant notwithstanding variations in response characteristics of the photomultiplier tube to changes in wavelength or color of the light source or changes in the intensity of the source light itself.

The voltage supply for the dynodes is obtained from a two thousand volt rectifier 98 which is of conventional design. The negative terminal of this rectifier is connected directly to the cathode and through a set of series resistors to each of the dynodes. The positive terminal of the power source 97 is connected through the series regulator tube 96 to ground. Therefore, the magnitude of the voltage upon the dynodes with respect to ground may be controlled directly by the series regulator tube 96.

A tuned amplifier 101 is also connected to the output of the photomultiplier tube 41 and is constructed similar to amplifier 71, as shown and described with reference to FIG. 3. The amplifier 101, however, has the coupling transformers tuned to 160 kilocycles with a bandwidth of approximately 15 kilocycles rather than 100 kilocycles in order to detect and pass the 160 kilocycles modulated specimen absorption information.

The demodulator 102 is shown in detail in FIG. 5 and consists of a phase discriminator 103, the output of which is applied to the Y-axis input of the oscilloscope 22 for display thereon. The input 105 of the demodulator is connected to the output 85 of the amplifier 101. This input is amplified and passed through the phase discriminator 103 and converted to a direct current signal representing the value of the light intensity passed by the specimen. A reference signal for the phase discriminator is obtained from coil 106 on the oscillator transformer 56 of the oscillator 36. This reference signal is amplified and passed through an adjustable phase shift network 107. The output of the cathode follower 108 is then applied to the phase discriminator 103 in order to assure that the signals demodulated by this portion of the circuit are only those signals which result from the light which has passed through the specimen 31 and the light modulator 35. This provides an inherent exclusion of all frequencies, except the modulating frequency, including the reference signal modulating frequency and any noise which may be present in the photomultiplier tube. The output 110 of the phase discriminator 103 is passed through a filter circuit 111 to remove all traces of the 160-kilocycle modulating frequency where it is then applied as a direct current signal to the Y-axis of the display oscilloscope 22.

As previously explained, the X-axis trace of the oscilloscope is controlled by a linear time base oscillator 21 which causes the oscilloscope electron beam to begin its horizontal trace when the prism in the monochromator starts from a limit position and begins the scan of the spectrum through slit 15. In the preferred embodiment of this invention, the oscilloscope is a Tektronix type 533 with a "CA" plug in amplifier. The linear time base oscillator 21 is physically a part of this oscilloscope. Alternatively, as briefly mentioned above, a potentiometer or other position indicating transducer could be attached to the prism drive mechanism and used to indicate the wavelength of the light passing through the specimen and to control the position of the electron beam along the X-axis of the oscilloscope.

The face of the oscilloscope cathode ray tube thus presents a visual representation of the absorption characteristics of the specimen as a function of wavelength. A permanent record of the pattern on the oscilloscope may be obtained by photographing the face of the tube by conventional methods. On the other hand, while a single scan of the spectrum may be photographed, it may be preferred to scan continuously a preselected portion of the spectrum while observing the display for any change in the absorption pattern.

While the apparatus in its preferred form has been described using a band pass filter in both the reference circuit and the monitoring circuit, it is understood that other forms and modifications of these circuits are possible. For example, in the specimen or monitoring circuit, it is only required that the 100-kilocycle reference signal be eliminated since all other signals could possibly contain information regarding transient responses or reactions in the specimen undergoing test. Therefore, either a high pass filter, adjusted to pass frequencies above 100 kilocycles, or a notch filter, designed to merely eliminate the 100-kilocycle reference signal, could be used in place of the band pass filter in amplifier 101. A band pass filter, on the other hand, improves the signal to noise ratio and when coupled with a phase discriminator in the output circuit, provides an accurate representation of the absorption characteristics of the specimen.

The control circuit used to maintain the reference signal output of the photomultiplier tube constant could also be modified according to well known principles. Thus, rather than controlling the voltage on the dynode of the photomultiplier tube, it would be possible to control the gain of an amplifier in the circuit following the photomultiplier.

Reference is now made to the block diagram of FIG. 6 which shows another embodiment of the invention wherein a single oscillator modulates both electrooptic light modulators, but wherein the signal to one of the light modulators differs in phase from the signal to the other light modulator. Components which are functionally similar to those shown in FIG. 1 are identified by the same reference numeral.

A single oscillator 120 supplies power to both the electrooptic light modulator 35 positioned in the specimen beam and the electrooptic light modulator 45 in the reference beam path. However, phase shift circuit 121 modifies the signal to light modulator 45 so that the reference beam is modulated at a frequency which is the same as the specimen beam but which differs therefrom in phase. The magnitude of the phase shift is relatively unimportant as long as it is sufficient so that the electrical signals generated by the photomultiplier 41 which represents the intensity of the light from both the specimen beam and the reference beam are distinguishable.

Both the specimen beam and the reference beam are directed into a photoelectric transducer which, in the preferred embodiment, is a photomultiplier which converts the light into electrical signals representing the intensity of the combined beams. The electrical output of the photomultiplier 41 is amplified by amplifier 123 and its output is applied to a phase detector and amplifier 125 which, when supplied with a reference signal from the phase shift circuit 121, detects the electrical signal representing the intensity of the reference beam.

Thus, the same electrical signal that is used to drive the electrooptic light modulator in the reference beam is applied as a reference to the phase detector 125 connected in the output circuit of the photoelectric transducer, and that phase detector will demodulate only that portion of the total signal which represents the intensity of the light in the reference beam.

The output of the circuit 125 therefore is a voltage representing the intensity of the reference beam and this voltage is applied to the dynode voltage control circuit 73 to adjust the dynode voltage on the photomultiplier 41 so that the electrical signal representing the reference beam remains at a constant value. As mentioned previously, other means of controlling the output from the photomultiplier may be employed, such as controlling the gain of an amplifier stage which follows the photomultiplier.

The output from the amplifier 123 is also applied to the phase detector amplifier circuit 130 which is provided with a phase reference directly from the oscillator 120 so that it detects and amplifies only those signals which are modulated at the frequency of an in phase with the oscillator 120 and the modulator 35.

Thus, the modulating signal which is applied to the electrooptic light modulator in the specimen beam is also applied as a reference signal to the phase detector 130 connected in the output circuit of the photoelectric transducer so that only those signals within the total signal which have the same phase as the signal which modulates the specimen beam will be detected and demodulated.

The electrical signal representing the intensity of the specimen beam is therefore detected by the circuit 130 and its output is applied to a display device, such as oscilloscope 22, where the absorption characteristics of the specimen 31 may be displayed, if desired, as a function of the wavelength of the source beam.

Since the photomultiplier 41 response characteristics are compensated for by the circuit including the phase detector 125 and dynode voltage control 73, the absorption characteristics as displayed on the oscilloscope 22 will be a more accurate representation of the actual absorption characteristics of the specimen than if no compensation were made in the photomultiplier or its output circuit.

While electrooptic light modulators have been described, it is to be understood that other light modulating elements, such as acoustooptic light modulators, may be employed to accomplish the same function, that of modulating the beams of light.

As will be apparent to those skilled in the art, it is only required that the signals driving the light modulator in the specimen and reference beams be modulated in such a manner that they differ one from the other, either in phase or in frequency, by an amount so that they can be distinguished in the output circuit of the photoelectric transducer. Thus, any amount of phase shift, provided it causes a distinguishable difference in the signal output, may be introduced between the reference and specimen beams, and thus the invention is not limited to a 90° phase shift as shown in FIG. 6.

It will also be apparent to those skilled in the art that the phase shift circuit can be placed either between the oscillator and the reference beam light modulator or between the oscillator and the specimen beam light modulator without departing from the scope of this invention.

In the embodiment shown in FIG. 6, a single oscillator or frequency source and a single bias supply may be used for both light modulators, thus reducing the cost of equipment.

Thus, a spectrophotometer having a fast response time and sensitive to transient changes in the absorption characteristics of the specimen has been described. This spectrophotometer also permits the specimens to be scanned with fast changing monochromatic wavelengths at a substantially higher rate than the prior art spectrophotometers, and it automatically compensates for changes in the source light intensity and response characteristics of the photoelectric transducer to give an accurate and reliable indication of the specimen absorption characteristics.

While the form of apparatus herein described constitutes a preferred embodiment of the invention, it is to be understood that this invention is not limited to this precise form of apparatus, and that changes may be made therein without departing from the scope of the invention.

What is claimed is.

1. A method for analyzing the light absorbing characteristics of a specimen comprising the steps of
    creating a source beam of light;
    dividing said source beam into a continuous reference beam and a continuous specimen beam;
    modulating said reference beam;
    passing said specimen beam through the specimen being analyzed;
    modulating said specimen beam to impart thereto a characteristic by which it may be distinguished from said reference beam;
    directing both said reference beam and said sample beam simultaneously onto a photoelectric transducer;
    converting the modulated light energy of the reference beam into a first electrical output signal by said photoelectric transducer;
    maintaining said first electrical signal constant to compensate for variations in the intensity of the source beam and/or variable response characteristics of said photoelectric transducer with changes in the wavelength of said source beam; and
    converting said modulated light energy of the specimen beam by the same said photoelectric transducer into a second electrical output signal representative of the light energy which said specimen beam contributes to the combined beam such that the magnitude of the second electrical output signal is representative of the absorption characteristics of the specimen.

2. The method of claim 1 wherein said specimen beam is modulated at a frequency different from the frequency at which the reference beam is modulated.

3. The method of claim 1 wherein said specimen beam is modulated at a frequency which is the same as that of the reference beam but which differs the therefrom in phase.

4. The method of claim 1 including the further steps of
    varying the wavelength of said source beam of monochromatic light over a predetermined range of wavelengths; and
    displaying the magnitude of said second electrical output signal as a function of said source wavelength.

5. The method of claim 1 including the further steps of
    cyclically varying the wavelength of the monochromatic source beam of light;
    generating a third electrical signal which may be calibrated in terms of the varying wavelength of said source beam; and
    displaying the magnitude of said second electrical output signal on a cathode ray tube as a function of said third electrical signal and therefore as a function of the wavelength of said source beam.

6. A spectrophotometer for analyzing the absorption characteristics of a specimen at various wavelengths of light, the spectrophotometer including
    a light source for supplying a beam of light along a specimen path and through the specimen being analyzed and also along a reference path,
    a single photoelectric transducer for simultaneously converting the intensity of the light beams from both the specimen path and the reference path into electrical signals,
    a monochromator positioned intermediate said source and said transducer,
    means for dividing said beam of light into a continuous reference beam and a continuous specimen beam;
    means for modulating said reference beam;
    means for modulating said specimen beam to impart thereto a characteristic by which it may be distinguished from said reference beam;
    means responsive to the electrical signals from said transducer for detecting the electrical signal representing the intensity of said reference beam;
    control circuit means responsive to sad reference electrical signal for maintaining said reference signal at a constant magnitude independent of changes in the intensity of the light output from said monochromator and/or changes in the wavelength response characteristics of said photoelectric transducer; and
    means responsive to the electrical signals from said photoelectric transducer for detecting the electrical signal representing the intensity of said specimen beam and thus the amount of light passing through said specimen at any given wavelength.

7. The spectrophotometer of claim 6 wherein said means for modulating said reference beam modulates said beam at a first frequency and wherein said means for modulating said specimen beam modulates said specimen beam at a second frequency different from said first frequency.

8. The spectrophotometer of claim 6 wherein said means for modulating said reference beam modulates said beam at a first frequency, and wherein said means for modulating said specimen beam modulates said specimen beam at a frequency which is the same as but which differs in phase from the modulated reference beam.

9. The spectrophotometer as defined in claim 6 further including
    means for providing an electrical signal representing the wavelength of the monochromatic light source; and
    display means connected to said wavelength representing means and to said means for detecting the specimen signal for visually presenting the adsorption characteristics of the specimen being analyzed as a function of the wavelength of the source beam which passes therethrough.

10. The apparatus as defined in claim 6 wherein each of said means for modulating said specimen beam and said reference beam includes
    at least one polarizing filter in the path of each beam;
    a light modulating device positioned in the path of each beam; and
    means for supplying electrical signals to each of said light modulating devices to modify its angle of polarization and thus vary the intensity of each said beam.

11. The apparatus as defined in claim 10 wherein said means for supplying electrical signals to said light modulating devices includes a first oscillator for modulating said device in said specimen beam at a first frequency and a second oscillatory for modulating said device in said reference beam at a second frequency different from said first frequency.

12. The apparatus as defined in claim 11 wherein said specimen signal detecting means includes a phase discriminator connected to the output of said transducer and which obtains a phase reference signal from the same electrical signal which modulates said specimen beam.

13. The apparatus as defined in claim 10 wherein said means for supplying electrical signals to said light modulating devices is a single oscillator which modulates both said specimen beam and said reference beam at the same frequency, said apparatus further including phase shifting means between said oscillator and one of said light modulating devices to impart a characteristic to its corresponding beam by which it may be distinguished from the other said beam.

14. The apparatus as defined in claim 10 wherein said light modulating devices are electrooptic light modulators.

15. The apparatus as defined in claim 10 wherein said light modulting devices are acoustooptic light modulators.

16. The spectrophotometer as defined in claim 6 wherein said source beam of monochromatic light is formed by a monochromator and a drive means to cause said monochromator to produce a narrow bandwidth beam of light having a cyclically varying wavelength;
a linear time base oscillator;
means connected to said monochromator to indicate the occurrence of a preselected wavelength and to trigger said linear time base oscillator thereby producing a cyclically variable electrical signal representing the wavelength output of said monochromator;
display means connected to the means for detecting the specimen signal and to said linear time base oscillator for visually presenting the absorption charactristics of the specimen as a function of wavelength independent of any variations in response characteristics of photoelectric transducer and the monochromatic light source intensity.

17. The apparatus as defined in claim 6 further including means to mount a specimen holder in the path of the reference beam identical to the means mounting the specimen beam path to compensate the spectrophotometer for any absorption characteristics of the specimen mounting means itself.

18. The spectrophotometer defined in claim 6 wherein said means for modulating both said reference beam and said specimen beam includes electrooptic light modulators;
said apparatus further including an oscillator supplying a modulating signal to one of said light modulators; and
a phase shift network connected between said oscillator and the other of said light modulators for supplying a modulating signal to cause the light in that beam to be modulated at a frequency which is the same as but which differs in phase from the beam modulated by the first modulator;
wherein said means for detecting said reference signal includes a phase detector having a reference input from the signal which modulates the light modulator in the reference beam path so that only those signals which are modulated at the frequency of and in phase with said reference beam are detected; and
wherein said means for detecting the electrical signal representing the absorption characteristics of the specimen includes a phase detector having a reference input from the signal which modulates the light modulator in the specimen path so that only those signals which are modulated at the frequency of and in phase with said specimen beam are detected.

19. The spectrophotometer defined in claim 6 wherein said means for modulating both said reference beam and said specimen beam includes acoustooptic light modulators;
said apparatus further including an oscillator supplying a modulating signal to one of said light modulators; and
a phase shift network connected between said oscillator and the other of said light modulators for supplying a modulting signal to cause the light in that beam to be modulated at a frequency which is the same as but which differs in phase from the beam modulated by the first modulator;
wherein said means for detecting said reference signal includes a phase detector having a reference input from the signal which modulates the light modulator in the reference beam path so that only those signals which are modulated at the frequency of and in phase with said reference beam are detected; and
wherein said means for detecting the electrical signal representing the absorption characteristics of the specimen includes a phase detector having a reference input from the signal which modulates the light modulator in the specimen path so that only those signals which are modulated at the frequency of and in phase with said specimen beam are detected.

References Cited

UNITED STATES PATENTS

| | | |
|---|---|---|
| 2,984,149 | 5/1961 | Herscher et al. |
| 3,414,729 | 12/1968 | Warren _____ 356—97 |

OTHER REFERENCES

"Double Beam Spuectrometer With 10-msec. Recording Time," Niesel et al., "The Review of Scientific Instruments," vol. 35, No. 5, May 1964, pp. 578–581.

"Highly Sensitive Recording Microspectrophotometer," Chance et al., "The Review of Scientific Instruments," vol. 30, No. 8, August 1959, pp. 735–741.

RONALD L. WILBERT, Primary Examiner

V. P. McGRAW, Assistant Examiner

U.S. Cl. X.R.

250—43.5, 226; 356—93